US009011022B2

(12) United States Patent
Ko et al.

(10) Patent No.: US 9,011,022 B2
(45) Date of Patent: Apr. 21, 2015

(54) COMBINED OPTICAL AND ELECTRICAL INTERFACE

(71) Applicants: Jamyuen Ko, Santa Clara, CA (US); Hengju Cheng, Mountain View, CA (US); Simon S. Lee, San Jose, CA (US)

(72) Inventors: Jamyuen Ko, Santa Clara, CA (US); Hengju Cheng, Mountain View, CA (US); Simon S. Lee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/134,469

(22) Filed: Dec. 19, 2013

(65) Prior Publication Data

US 2014/0178009 A1    Jun. 26, 2014

Related U.S. Application Data

(62) Division of application No. 13/496,798, filed on May 29, 2012.

(51) Int. Cl.
*G02B 6/36* (2006.01)

(52) U.S. Cl.
CPC ......................................... *G02B 6/36* (2013.01)

(58) Field of Classification Search
CPC .............. G02B 6/36; G02B 6/43; G02B 6/42
USPC ......................................... 385/76–78, 88–89
See application file for complete search history.

(56) References Cited

U.S. PATENT DOCUMENTS

| 4,781,431 A | 11/1988 | Wesson et al. |
| 4,944,568 A | 7/1990 | Danbach et al. |
| 5,109,452 A | 4/1992 | Selvin et al. |
| 5,241,612 A | 8/1993 | Iwama |
| 5,242,315 A | 9/1993 | O'Dea |
| 6,356,692 B1 | 3/2002 | Ido et al. |
| 6,499,889 B1 | 12/2002 | Shirakawa et al. |
| 6,500,026 B2 | 12/2002 | Yamaguchi |
| 6,584,519 B1 | 6/2003 | Russell |
| 6,739,766 B2 * | 5/2004 | Xu et al. .......................... 385/93 |
| 6,755,575 B2 | 6/2004 | Kronlund et al. |
| 6,964,578 B2 | 11/2005 | Clark et al. |

(Continued)

FOREIGN PATENT DOCUMENTS

| CN | 87216477 U | 8/1998 |
| CN | 2475175 Y | 1/2002 |

(Continued)

OTHER PUBLICATIONS

Office Action Received for Japanese Patent Application No. 2012-529726, mailed on Jun. 3, 2014, 4 Pages of Japanese Office Action and 4 Pages of English Translation.

(Continued)

*Primary Examiner* — Ellen Kim
(74) *Attorney, Agent, or Firm* — Vincent Anderson Law, PC

(57) ABSTRACT

A connection port provides electrical and/or optical interface capability. The combined electrical and optical interface port may include an optical communication light engine within the connection port itself. The connection port includes a connector housing, an electrical interface assembly, and an optical interface assembly incorporated together. One implementation of the optical communication light engine includes a laser diode to generate optical signals, a photo diode to receive optical signals, and an optical integrated circuit (IC) to control optical interface.

10 Claims, 11 Drawing Sheets

(56) References Cited

U.S. PATENT DOCUMENTS

| | | | |
|---|---|---|---|
| 6,981,887 B1 | 1/2006 | Mese et al. | |
| 7,077,686 B2 | 7/2006 | Seo et al. | |
| 7,182,646 B1 | 2/2007 | Chou et al. | |
| 7,213,979 B2 | 5/2007 | Park | |
| 7,347,632 B2 | 3/2008 | Farr | |
| 7,374,349 B2 | 5/2008 | Wang | |
| 7,446,298 B1 | 11/2008 | Stone | |
| 7,494,287 B2 | 2/2009 | Wang et al. | |
| 7,572,071 B1 | 8/2009 | Wu | |
| 7,578,623 B2* | 8/2009 | Wang et al. | 385/88 |
| 7,659,551 B2 | 2/2010 | Loh | |
| 7,699,663 B1 | 4/2010 | Little et al. | |
| 7,717,733 B1 | 5/2010 | Yi et al. | |
| 7,798,726 B2 | 9/2010 | Sabo | |
| 7,876,989 B2* | 1/2011 | Aronson et al. | 385/101 |
| 7,883,371 B1 | 2/2011 | Chen et al. | |
| 7,887,243 B2 | 2/2011 | Abel et al. | |
| 7,896,559 B2* | 3/2011 | Yi et al. | 385/75 |
| 7,985,026 B1 | 7/2011 | Lin et al. | |
| 8,251,593 B2 | 8/2012 | Liao | |
| 8,262,296 B2 | 9/2012 | Liao et al. | |
| 8,398,314 B2 | 3/2013 | Ko et al. | |
| 8,403,568 B2 | 3/2013 | Wang et al. | |
| 8,565,562 B2 | 10/2013 | Ko | |
| 2002/0004336 A1 | 1/2002 | Yamaguchi | |
| 2002/0006748 A1 | 1/2002 | Tolmie et al. | |
| 2002/0102066 A1 | 8/2002 | Nishita | |
| 2003/0133687 A1 | 7/2003 | Han et al. | |
| 2004/0042735 A1 | 3/2004 | Ma | |
| 2004/0184738 A1 | 9/2004 | McColloch et al. | |
| 2004/0218372 A1 | 11/2004 | Furuyama et al. | |
| 2005/0156304 A1 | 7/2005 | Furuyama et al. | |
| 2005/0180700 A1 | 8/2005 | Farr | |
| 2005/0244110 A1* | 11/2005 | Togami et al. | 385/92 |
| 2006/0039655 A1 | 2/2006 | Wilson | |
| 2006/0056779 A1 | 3/2006 | Wang | |
| 2006/0093285 A1 | 5/2006 | Park | |
| 2006/0263012 A1 | 11/2006 | Yamazaki | |
| 2006/0274394 A1 | 12/2006 | Riley et al. | |
| 2006/0291784 A1 | 12/2006 | Wang et al. | |
| 2007/0122156 A1 | 5/2007 | Wang et al. | |
| 2008/0025676 A1 | 1/2008 | Wang | |
| 2008/0044143 A1 | 2/2008 | Wang et al. | |
| 2008/0112707 A1 | 5/2008 | Mongold | |
| 2008/0131058 A1 | 6/2008 | Tsunoda et al. | |
| 2008/0320200 A1 | 12/2008 | Pederson et al. | |
| 2009/0154884 A1 | 6/2009 | Chen et al. | |
| 2009/0274422 A1 | 11/2009 | Henry et al. | |
| 2009/0324176 A1 | 12/2009 | Cheng et al. | |
| 2010/0046891 A1 | 2/2010 | Sabo | |
| 2010/0080519 A1 | 4/2010 | Ko et al. | |
| 2010/0104244 A1 | 4/2010 | Grinderslev | |
| 2010/0226612 A1 | 9/2010 | Sedio et al. | |
| 2010/0278490 A1 | 11/2010 | Liao et al. | |
| 2010/0290745 A1 | 11/2010 | Liao et al. | |
| 2010/0303420 A1 | 12/2010 | Lin et al. | |
| 2011/0021088 A1 | 1/2011 | Chen et al. | |
| 2011/0085766 A1 | 4/2011 | Liao et al. | |
| 2011/0091160 A1 | 4/2011 | He et al. | |
| 2011/0091161 A1 | 4/2011 | He et al. | |
| 2011/0091162 A1 | 4/2011 | He et al. | |
| 2011/0097040 A1 | 4/2011 | Lin et al. | |
| 2011/0097041 A1 | 4/2011 | Liao et al. | |
| 2011/0097042 A1 | 4/2011 | Liao et al. | |
| 2011/0097043 A1 | 4/2011 | He et al. | |
| 2011/0142401 A1 | 6/2011 | Lin et al. | |
| 2011/0158585 A1 | 6/2011 | Chang et al. | |
| 2011/0299816 A1 | 12/2011 | Yen et al. | |

FOREIGN PATENT DOCUMENTS

| | | |
|---|---|---|
| CN | 1523650 A | 8/2004 |
| CN | 101310417 A | 11/2008 |
| CN | 101345358 A | 1/2009 |
| JP | 64-54406 A | 3/1989 |
| JP | 4-340508 A | 11/1992 |
| JP | 5-113519 A | 5/1993 |
| JP | 11-202166 A | 7/1999 |
| JP | 2001-167837 A | 6/2001 |
| JP | 2002-050978 A | 2/2002 |
| JP | 2002-82258 A | 3/2002 |
| JP | 2002-117948 A | 4/2002 |
| JP | 2002-190344 A | 7/2002 |
| JP | 2003-107277 A | 9/2003 |
| JP | 2004-39258 A | 2/2004 |
| JP | 2004-253456 A | 9/2004 |
| JP | 2006-050292 A | 2/2006 |
| JP | 2006-319836 A | 11/2006 |
| JP | 2010-520569 A | 6/2010 |
| KR | 10-2006-0054914 A | 5/2006 |
| KR | 10-2008-0030951 A | 4/2008 |
| KR | 10-2008-0091414 A | 10/2008 |
| TW | M304153 U | 1/2007 |
| TW | M341336 U | 9/2008 |
| WO | 2006/077961 A1 | 7/2006 |
| WO | 2007/033042 A2 | 3/2007 |
| WO | 2007/088863 A1 | 8/2007 |
| WO | 2008/121731 A1 | 10/2008 |
| WO | 2011/034544 A1 | 3/2011 |

OTHER PUBLICATIONS

Office Action Received for Korean Patent Application No. 10-2012-7011054, mailed on Jun. 27, 2014, 4 Pages of Korean Office Action and 3 Pages of English Translation.

Office Action received for Korean Patent Application No. 10-2012-7008334, mailed on Sep. 29, 2014, 5 pages of Office Action including 2 pages of English Translation.

Office Action received for Chinese Patent Application No. 200980161520.8, mailed on Aug. 4, 2014, 8 pages of Office Action including 5 pages of English Translation.

International Search Report and Written Opinion received for PCT Patent Application No. PCT/US2009/058304, mailed on Apr. 30, 2010, 11 pages.

Office Action Received for Japanese Patent Application No. 2009-552939, mailed on Aug. 23, 2011, 3 pages.

Notice of Allowance Received for Korean Patent Application No. 2009-7020350, mailed on Nov. 29, 2011, 3 pages.

Office Action Received for Korean Patent Application No. 2009-7020350 mailed on Feb. 10, 2011, 4 pages.

Notice of Allowance Received for GB Patent Application No. GB0915900.5, mailed on Apr. 15, 2011, 1 page.

International Search Report and Written Opinion received for PCT Patent Application No. PCT/US2008/058496, mailed on Aug. 18, 2008, 9 pages.

International Preliminary Report on Patentability received for PCT Patent Application No. PCT/US2008/058496, mailed on Oct. 15, 2009, 5 pages.

Office Action Received for Chinese Patent Application No. 200810100363.7 mailed on Mar. 11, 2010, 5 pages.

Notice of Allowance Received for Chinese Patent Application No. 200810100363.7 mailed on Nov. 15, 2010, 4 pages.

Office Action Received for Taiwanese Patent Application No. 97111354, mailed on Aug. 12, 2011, 4 Pages.

International Search Report and Written Opinion received for PCT Patent Application No. PCT/US2009/057598, mailed on Jun. 11, 2010, 12 pages.

International Preliminary Report on Patentability received for PCT Patent Application No. PCT/US2009/057598, mailed on Mar. 29, 2012, 8 pages.

International Search Report and Written Opinion received for PCT Patent Application No. PCT/US2011/052657, mailed on Apr. 26, 2012, 12 pages.

International Preliminary Report on Patentability received for PCT Patent Application No. PCT/US2009/058304, mailed on Apr. 14, 2011, 6 pages.

Office Action Received for Taiwanese Patent Application No. 98132907, mailed on Jul. 25, 2012, 5 Pages.

(56) References Cited

OTHER PUBLICATIONS

Office Action Received for Korean Patent Application No. 10-2011-7007290 mailed on Apr. 25, 2012, 9 pages.

Office Action Received for Korean Patent Application No. 10-2011-7007290 mailed on Aug. 13, 2012, 2 pages.

Office Action Received for Korean Patent Application No. 10-2011-7007290 mailed on Sep. 28, 2012, 4 pages.

Office Action Received for Chinese Patent Application No. 200980137745.X mailed on Feb. 5, 2013, 5 pages.

International Preliminary Report on Patentability received for PCT Patent Application No. PCT/US2011/052657, mailed on Apr. 4, 2013, 10 pages.

Office Action Received for Korean Patent Application No. 10-2012-7008334, mailed on Oct. 28, 2013, 6 Pages of Korean Office Action and 6 Pages of English Translation.

Office Action Received for Japanese Patent Application No. 2012-529726, mailed on Jul. 30, 2013, 4 Pages of Japanese Office Action and 4 Pages of English Translation.

Office Action Received for Chinese Patent Application No. 200980161520.8, mailed on Jan. 13, 2014, 7 Pages of Chinese Office Action and 11 Pages of English Translation.

* cited by examiner

COMBINED OPTICAL AND ELECTRICAL INTERFACE

This application is a divisional of U.S. application Ser. No. 13/496,798 entitled "COMBINED OPTICAL AND ELECTRICAL INTERFACE" filed Sep. 18, 2009 which was filed under 35 U.S.C. §371 as a U.S. National Phase application of, and claims the benefit of priority of, International Application No. PCT/US2009/057598, filed Sep. 18, 2009, entitled COMBINED OPTICAL AND ELECTRICAL INTERFACE, the entire contents of which are incorporated herein by reference.

FIELD

Embodiments of the invention are generally related to input/output (I/O) interfaces, and more particularly to I/O interfaces and associated connectors having both optical and electrical interface capability.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2009, Intel Corporation, All Rights Reserved.

BACKGROUND

Current computer platform architecture design encompasses many different interfaces to connect one device to another device. The interfaces provide I/O (input/output) for computing devices and peripherals, and may use a variety of protocols and standards to provide the I/O. The differing interfaces may also use different hardware structures to provide the interface. For example, current computer systems typically include multiple ports with corresponding connection interfaces, as implemented by physical connectors and plugs at the ends of the cables connecting the devices. Common connector types may include a Universal Serial Bus (USB) subsystem with a number of associated USB plug interfaces, DisplayPort, High Definition Multimedia Interface (HDMI), Firewire (as set forth in IEEE 1394), or other connector type.

As computing devices grow smaller in size, the physical space requirements for the physical ports, as well as the printed circuit board (PCB, or PC board) requirements for the circuits to drive the ports, become more significant. Thus, providing all available interfaces, or even a significant number of them, may not be practical. Additionally, there may be certain interfaces (e.g., USB) that is extremely prevalent, but that does not have the bandwidth capacity of other interfaces (e.g., optical interfaces). All interfaces also face practical issues of usability and durability (peripheral devices may be plugged and unplugged many times), which can negatively affect the precision of alignment of a plug, reducing the effectiveness of the interface.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
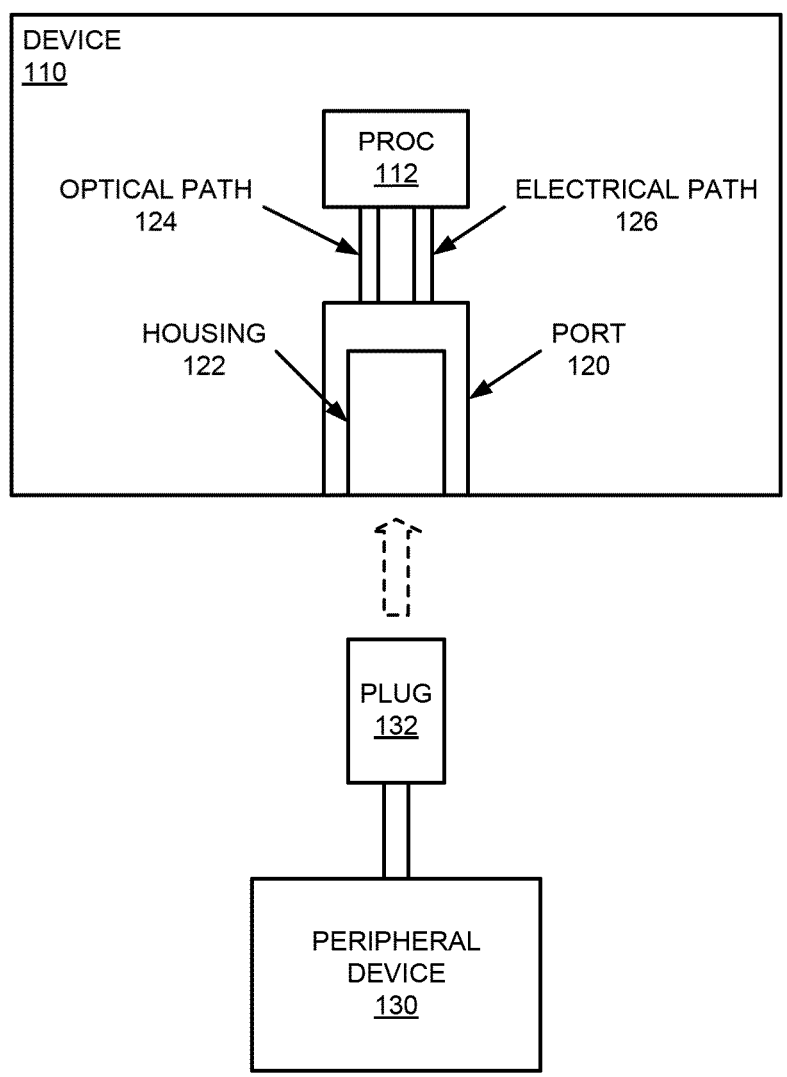
FIG. 1 is a block diagram of an embodiment of a combined optical and electrical interface.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a connection port provides electrical and/or optical interface capability. Certain embodiments describe mechanisms for interfacing and alignment. Certain embodiments describe mechanisms that reduce PCB real estate for interfaces and/or improve signal quality. In general, a combined electrical and optical interface port includes optical and electrical components within a single port, and/or corresponding plug, which may also be referred to herein as a connector and a mating or corresponding connector.

In one embodiment, the combined connector includes an optical communication light engine within the combined connector itself. The combined connector includes a connector housing, an electrical interface assembly, and an optical interface assembly incorporated together. In one embodiment, the optical communication light engine includes a laser diode to generate optical signals, a photo diode to receive optical signals, and an optical integrated circuit (IC) to control optical interface.

In one embodiment, the combined connector includes a floatable optical lens that allows the lens to be movable, rather than rigid or fixed. Together with an alignment mechanism, the floatable lens can interface with a mating connector and provide an aligned interface, within tolerance. The alignment is less susceptible to disturbance from repeated use of the connector, given that the lens is floatable instead of rigidly fixed within the connector.

In one embodiment, the combined connector includes a pluggable optical lens assembly, which acts as a jumper assembly to optically exchange signals with another component. Rather than terminating the optical signal at the connector or within the immediate physical vicinity of the connector on a PCB on which the connector is mounted, the optical signal can be conveyed optically over at least a portion of a distance from the connector to a processing component. Traditionally, the optical signal is terminated and conveyed to the processing component electrically (or conveyed electrically to the connector to transmit optically), which may reduce signal quality and/or restrict signal bandwidth. By conveying the signal optically at least a portion of the distance between the connector and processing component, the signal quality can be retained, and increased bandwidth is possible.

In one embodiment, a latch component secures an optical connector portion to a lens component installed on a PCB. The latch can align and secure the optical interfaces (e.g., the optical fibers) to the lens to provide good signal transfer capability. Significantly, the latch can be installed post reflow processing of the PCB, keeping the fibers and lens components off the PCB during the high-temperature processing of the PCB. Additionally, time-consuming and costly manual alignment of the fibers is not needed when the latch can physically interface and align the fibers to the PCB-installed lens component.

A connector port may be said to be configured in a 'flipped' configuration or a 'non-flipped' configuration. The flipped configuration requires "flipping" the corresponding plug to align the electrical contacts. For example, in a flipped USB configuration, the electrical contacts are located on the bottom (assuming an orientation where the PCB is at the bottom of the connector) of the connector. A flipped USB configuration has the electrical contacts located at the top of the connector. A non-flipped configuration may introduce a situation where the electrical leads for the contacts obstruct the space where the optical lens components need to be installed. Thus, the electrical and optical components must "compete" for the same physical space. With a lens tube holder that extends through the leads, the optical interface may be properly incorporated and aligned, while allowing the electrical leads to interconnect with the PCB.

FIG. 1 is a block diagram of an embodiment of a combined optical and electrical interface. System 100 includes device 110, which may include any of a number of devices, including a desktop or laptop computer, a netbook, or other such device. Besides computing devices, it will be understood that many other types of electronic devices may incorporate the one or more of the types of connector discussed herein, and the embodiments described herein would apply equally well in such electronic devices. Examples of other such electronic devices may include handheld devices, smartphones, media devices, multimedia devices, memory devices, cameras, voice recorders, I/O devices, networking devices, gaming devices, gaming consoles, or any other electronic device that might include such a connector.

Device 110 includes processor (proc) 112, which represents any type of processing component that processes electrical and/or optical signals I/O signals. Processor 112 is an abstraction, and it will be understood that a single processing device could be used, or multiple separate devices may be used. Processor 112 may include or be a microprocessor, programmable logic device or array, microcontroller, signal processor, or some combination.

Device 110 includes port 120, which interfaces with plug 132. Plug 132 is a connector plug that allows peripheral device 130 (which may be any of the same types of devices discussed above) to interconnect with device 110. Plug 132 may be directly build into peripheral device 130 (with or without a cord), or may be interconnected to peripheral device 130 via a standalone cable. Plug 132 supports communication via an optical interface, an electrical interface, or both.

Plug 132 mates with port 120 of device 110. As used herein, mating one connector with another refers to providing a mechanical connection. The mating of one connector with another typically also provides a communication connection. Port 120 includes housing 122, which provides the mechanical connection mechanisms. Port 120 also includes electrical and optical interface components. Optical path 124 represents one or more components, which may include processing and/or termination components that convey a signal between processor 112 and port 120. Conveying a signal may include the generation and converting to optical, or the receiving and converting to electrical, as described in more detail below.

Electrical path 126 represents one or more components that convey an electrical signal between processor 112 and port 120. It will be understood that while a portion of optical path 124 may include electrical components (especially for converting to/from electrical for processor 112), optical path 124 conveys a signal that is either received at or sent from device 110 as an optical signal. In contrast, electrical path 126 conveys a signal that is either received at or sent from device 110 as an electrical signal. Thus, optical path 124 provides a communication path for port 120 as an optical interface, and electrical path 126 provides a communication path for port 120 as an electrical interface.

Port 120, housing 122, and optical and electrical paths (124 and 126, respectively) support the connector embodiments described above. Thus, in one embodiment, port 120 may be a combined connector including an optical communication light engine within port 120. In one embodiment, port 120 includes a floatable lens for optical interfacing. In one embodiment, port 120 includes a pluggable optical lens assembly, where optical path 124 includes a jumper assembly to optically exchange signals with processor 112. In one embodiment, optical path 124 includes a latch component to secure an optical connector to a lens component installed on a PCB of device 110. Port 120 may be configured as a flipped or non-flipped connector. One or more of the embodiments described above can be combined.

While system 100 is described generally with respect to various embodiments, further detail about the various embodiments is described in more detail below.

With respect to the combined connector including a light engine within the connector, such a connector may be referred to as an active optical connector or active optical receptacle and active optical plug. In general, such an active optical connector includes a connector housing that provides the physical connection interface to a mating connector, an electrical contact assembly, and an optical assembly. The electrical contact assembly and/or the optical assembly could also be referred to as a "subassembly." Technically, an assembly may refer to a "finished" product, or a finished system or subsystem of a manufactured item, while a subassembly generally is combined with other components or another subassembly to complete a subassembly. However, a subassembly is not distinguished from an 'assembly' herein, and reference to an assembly may refer to what may otherwise be considered a subassembly.

The electrical contact assembly is physically incorporated or integrated or combined with the connector housing, and provides an electrical I/O interface. The optical assembly is physically incorporated with the connector housing, and provides an optical I/O interface. In one embodiment, the optical assembly includes a light engine to actively generate and/or receive, and process optical signals. The connection interface via the combined connector allows either electrical I/O or optical I/O or both via the different interfaces incorporated within the connector housing. Electrical I/O and optical I/O may occur simultaneously, or substantially simultaneously, or may be configured to operate separately or "take turns."

In one embodiment, the light engine may process the optical signals consistent with or in accordance with a protocol of the electrical I/O interface. It is not strictly necessary for the optical and electrical interfaces to operate according to the same protocol, but they may. Whether the light engine processes signals in accordance with the electrical I/O interface, or in accordance with a different protocol or standard, the light engine may be configured or programmed for an intended protocol within a particular connector, and different light engines may be configured for different protocols. In one embodiment, the light engine includes a laser diode to generate optical signals, a photo diode to receive optical signals, and an optical integrated circuit (IC) to control the laser diode and the photo diode.

In one embodiment, the photo diode, or a component with a photo diode circuit may be considered an optical termination component, seeing that the photo diode converts optical signals to electrical. The laser diode converts electrical signals to optical. The optical IC drives the laser diode (e.g., a vertical-cavity surface-emitting laser or VCSEL) based on a signal to be transmitted optically, by driving the laser with appropriate voltages to generate an output to produce the optical signal. The optical IC receives the electrical signals generated by the photo diode and processes them for interpretation. In one embodiment, the optical IC performs power management to turn off optical components (e.g., lasers, photo diodes) when not in use.

The electrical protocols or standards that may be used could include universal serial bus (USB) (standard or mini), high-definition multimedia interface (HDMI), or DisplayPort. It will be understood that each different standard may include a different configuration or pinout for the electrical contact assembly. Additionally, the size, shape and configuration of the connector housing is dependent on the standard, including tolerances for the mating of the corresponding connectors. Thus, the layout of the connector to integrate the optical I/O assembly may be different for the various standards. As will be understood by those of skill in the art, optical interfaces require line-of-sight connections to have an optical signal transmitter interface with a receiver (both may be referred to as lenses). Thus, the configuration of the connector will be such that the lenses are not obstructed by the corresponding electrical contact assemblies. For example, optical interface lenses can be positioned to the sides of the contact assemblies, or above or below, depending on where space is available within the connector housing.

Figure 2:
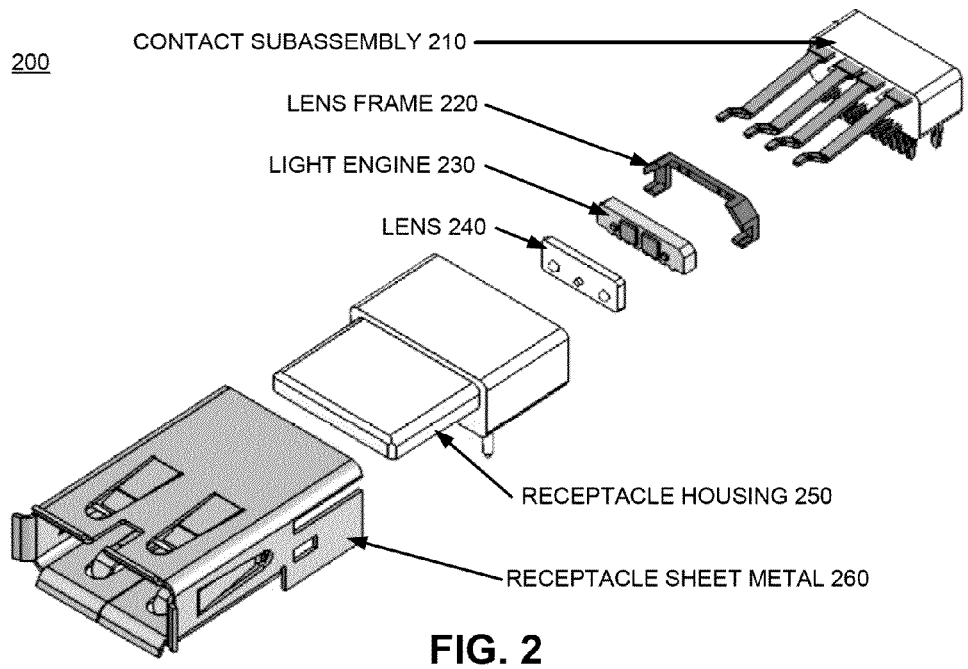
FIG. 2 is a block diagram of an embodiment of a combined optical and electrical interface port having a light engine incorporated in the port.

FIG. 2 is a block diagram of an embodiment of a combined optical and electrical interface port having a light engine incorporated in the port. Connector 200 (i.e., the completed assembly of components shown in FIG. 2) represents one example of a combined connector. More specifically, connector 200 represents a connector having an active light engine within the connector housing. While the specific example illustrated is a USB Standard-A connector, it will be understood that other connector types can be equally constructed as described herein. Thus, optical communication through a standard connector can be implemented in an active way by fitting electro-optical circuitry and optical components into the connector receptacle as shown with connector 200.

As illustrated, connector 200 includes receptacle sheet metal 260 and receptacle housing 250. Receptacle sheet metal 260 provides mechanical interfacing and grounds the connector. More particularly, receptacle sheet metal 260 provides positional rigidity for receptacle housing 250, and EMI (electromagnetic interference) shielding when connector 200 is mated with a corresponding plug. Receptacle housing 250 provides additional mechanical interfacing structure, and provides a structure or mechanical framework in which to incorporate the I/O interfaces. Electrical interfacing is provided via contact subassembly (or assembly) 210. Optical interfacing is provided by lens frame 220, light engine 230, and lens 240.

As suggested above, light engine 230 may include a laser diode, photo diode, and optical IC. The components that make up light engine 230 may be die and wire bonded onto a substrate such as FR4 PCB (also referred to as FR-4, or flame retardant 4, PCB), flex-board, or lead frame. Lens frame 220 provides accurate alignment between lens 240 and light engine 230 to reduce optical loss.

Lens 240 may be constructed of any appropriate material, which may include plastic, glass, silicon, or other materials that can be shaped and provide optical focusing. Currently, plastic lenses are a common choice, seeing they provide convenience in cost, manufacturing, and durability. In one embodiment, lens 240 is designed to support expanded-beam optical interfacing. In an expanded-beam approach, lens 240 expands and collimates transmit signals, and focuses receive signals. As is understood by those skilled in the art, collimating refers to making the photons of the light signal more parallel in reception. Beam expansion is discussed in more detail below with reference to FIG. 15.

Lens 240 allows connector 200 to expand an optical beam on transmit to facilitate optical communication. Additionally, lens 240 allows connector 200 to focus expanded optical beams for receive communication. Lens 240 focuses receive light onto the receive component of light engine 230 (e.g., a photo diode), and expands light from a transmit component of light engine 230 (e.g., a laser diode). As illustrated, a single optical channel is supported by connector 200. In one embodiment, connector 200 supports multiple optical channels. Additional optical channels will include a lens for transmit and receive, and corresponding transmit and receive components on light engine 230.

In one embodiment, connector 200 supports USB interfacing. In such an embodiment, contact subassembly 210 may include USB2 contacts, USB3 contacts, or both for backward compatibility and electrical communication purpose.

Figure 3:
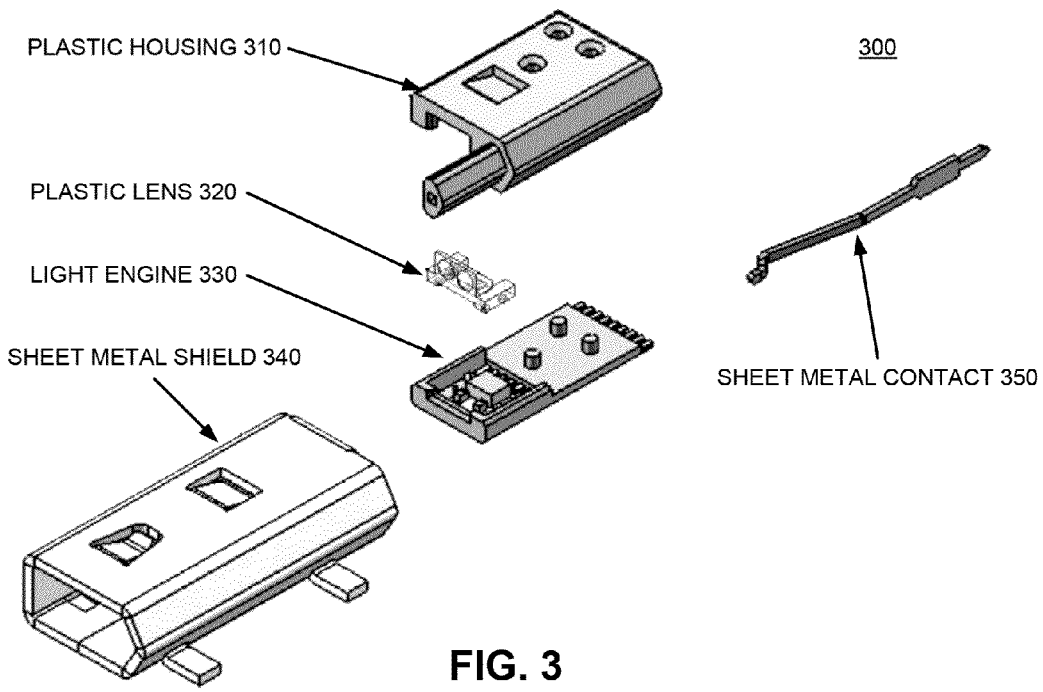
FIG. 3 is a block diagram of an embodiment of a combined optical and electrical interface plug having a light engine incorporated in the plug.

FIG. 3 is a block diagram of an embodiment of a combined optical and electrical interface plug having a light engine incorporated in the plug. Connector 300 (i.e., the completed assembly of components shown in FIG. 3) represents one example of a combined connector. More specifically, connector 300 is a connector that supports both optical and electrical interfacing. As illustrated, the structure of connector 300 resembles a USB Standard-B connector, complementary to connector 200 of FIG. 2. Again, the specific type of connector is only an example, and should not be construed as limiting.

Connector 300 includes sheet metal shield 340, to provide rigidity for plastic housing 310, as well as EMI shielding when connector 300 is mated. Plastic housing 310 provides mechanical interfacing for connector 300, as well as structure to provide electrical and optical interfacing. Plastic lens 320 and light engine 330 are incorporated with plastic housing 310 to provide an optical interface path. In one embodiment, light engine 330 includes a laser diode, photo diode, and optical IC. As with light engine 230 of FIG. 2, the components of light engine 330 may be die and wire bonded onto a substrate. In one embodiment, plastic housing 310 includes an internal slot fit with sheet metal contact 350 (which interfaces mechanically and electrically with a corresponding sheet metal housing of the mating connector). Plastic housing 310 may also include an alignment feature to minimize optical loss.

Figure 4:
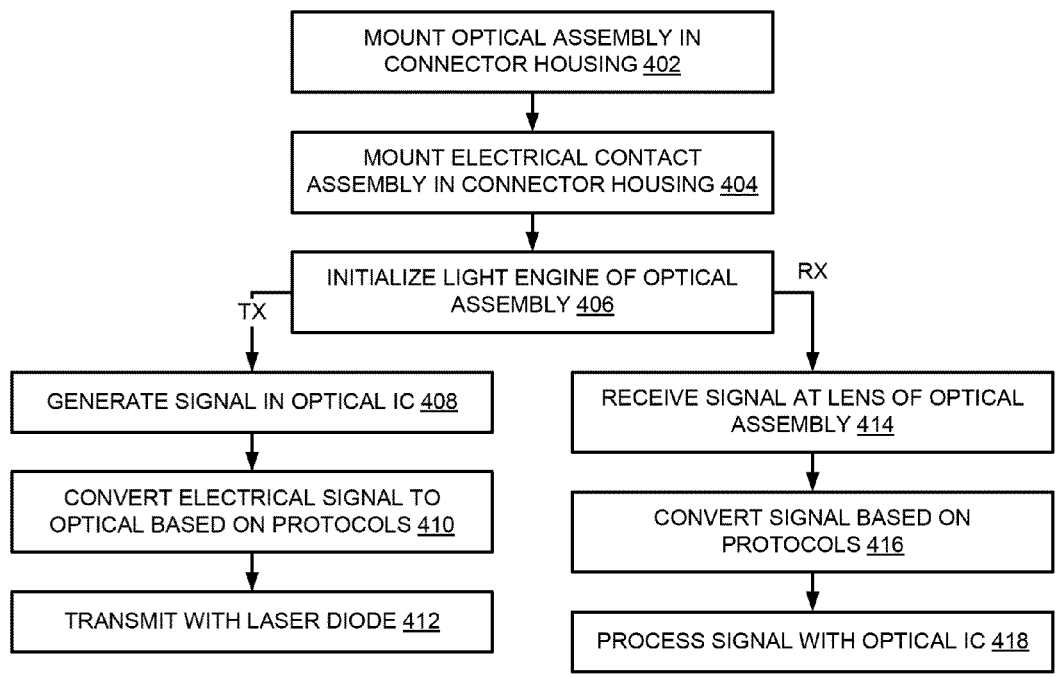
FIG. 4 is a flow diagram of an embodiment of sending and receiving optical signals with a combined optical and electrical interface.

FIG. 4 is a flow diagram of an embodiment of sending and receiving optical signals with a combined optical and electrical interface. Flow diagrams as illustrated herein provide examples of sequences of various process actions, which may be performed by processing logic that may include hardware, software, or a combination. Although shown in a particular sequence or order, unless otherwise specified, the order of the actions can be modified. Thus, the illustrated implementations should be understood only as an example, and the process can be performed in a different order, and some actions may be performed in parallel. Additionally, one or more operations can be omitted in various embodiments of the invention; thus, not all actions are required in every implementation. Other process flows are possible.

In one embodiment, an optical assembly is mounted in a connector housing, 402. An electrical assembly is also mounted in the connector housing, 404. The optical and electrical assemblies are described as being mounted, which refers to incorporating the assemblies in the physical structure of the connector (e.g., incorporating with the connector housing). Mounting the assemblies is one way to provide the optical and electrical interfaces. However, it will be understood that the assemblies and their associated communication paths could also be considered provided by initializing and/or configuring the communication paths within a host device. Thus, the assemblies may be provided, for example, when a software driver is prepared to interface with the hardware components of the path (e.g., a processor or a component or components that provide or generate a signal).

In one embodiment, the optical assembly includes a light engine. The light engine may need to be initialized for communication, 406. The light engine may be activated and inactivated dynamically during operation of a host system of which a combined optical and electrical connector is a part. The activating of the light engine may be considered to provide the optical path, and a similar process of activating (e.g., for purposes of conserving power) a deactivated electrical path may be considered to provide the path.

For transmit, a signal is generated within the system and transmitted out the connector to a remote device to which the host system is connected via the combined connector. Thus, a signal is generated in an optical IC, 408. The generated signal may be received from another part of the host system (e.g., sent to the IC from a driver) and then processed within the IC for transmission. The signal is converted from an electrical signal to an optical signal based on the protocols being implemented in the system, 410. The protocols include optical and/or electrical protocols for the connector incorporating the IC. The signal can then be transmitted with a laser diode, 412. The transmission of the signal with the laser diode can be considered the converting of the signal from electrical to optical.

For receive, a signal is received at a lens of the optical assembly, 414. The signal is transferred from the lens to, for example, a photo diode to convert the optical signal to electrical form for processing by the optical IC, 416. The converting of the signal may be with a photo diode at a light engine, or the optical signal may be conveyed to an optical termination component in close physical proximity to a processor that will receive the signal. In one embodiment, the optical IC processes the converted received signal, 418.

It will be understood that with an optical IC incorporated into the connector housing, conveying a signal from the connector to a different processor may be avoided. In such an embodiment, the connector itself is an optical transceiver, which uses less real estate on a PCB layout than a comparable passive approach where the optical processing is performed external to the connector.

As mentioned above, the optical interfaces between mating connectors should be aligned for proper signal exchange. In one embodiment, the optical assembly includes a floating lens. A floating lens is one that is not rigidly fixed within the connector housing, and allows a more flexible alignment of an optical fiber to an optical lens of the optical assembly.

In one embodiment, alignment is provided through a notch within the body of a lens component, which interfaces with a corresponding pin or tab of the mating component or connector. Alternatively, the body of the lens component could include the pin or tab to interface with a notch on the mating component or connector. In one embodiment, alignment may be improved by providing a spring force to press the floating lens into proper position.

Figure 5A:
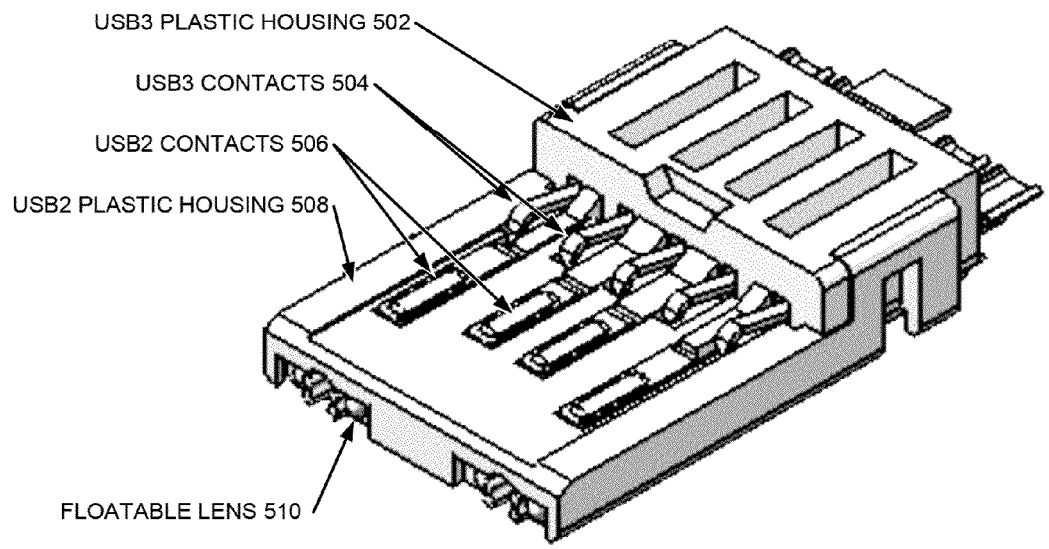
FIGS. 5A-5B are block diagrams of an embodiment of a combined optical and electrical interface with a floatable lens.
Figure 5B:
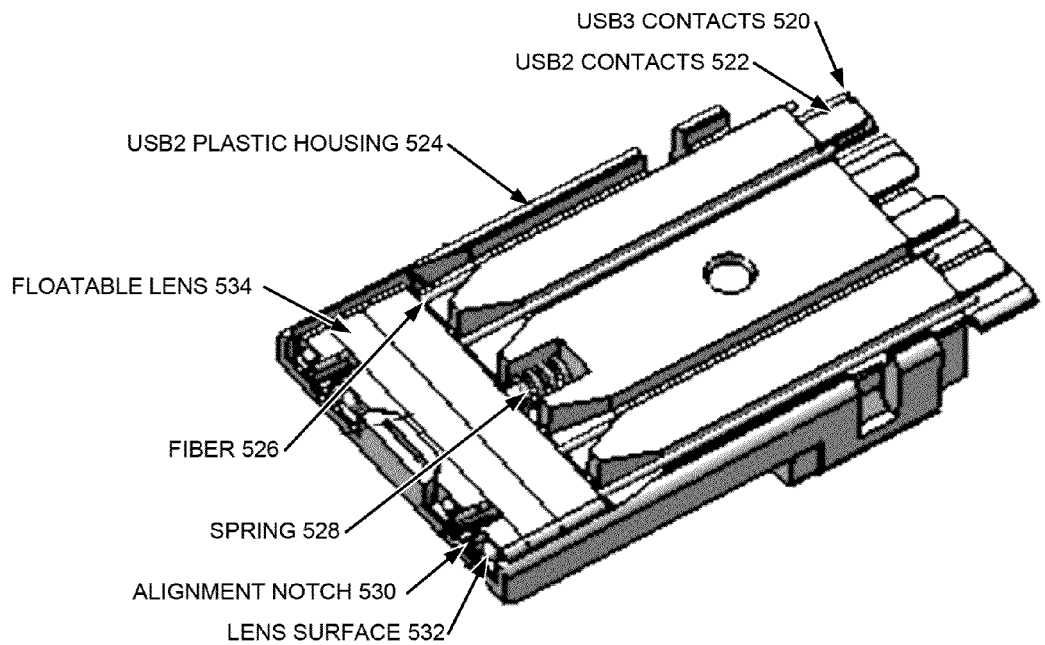

FIGS. 5A-5B are block diagrams of an embodiment of a combined optical and electrical interface with a floatable lens. The specific mechanical structure of the example in FIGS. 5A and 5B may resemble the inner structure of an optical USB Standard-A plug, but will be understood as non-limiting examples. FIG. 5A illustrates a connector having a floating optical lens from a perspective where an electrical interface is visible, and the floating lens is seen at the mating end of the connector. FIG. 5B illustrates a connector having a floating optical lens from a perspective of the component face that would be adjacent the connector housing wall.

Referring to FIG. 5A, the connector includes USB2 contacts 506, USB3 contacts 504, USB2 plastic housing 508, and USB3 plastic housing 502. The USB2 and USB3 contacts are electrical contact assemblies disposed within the plastic housings. To implement the floating lens mechanism in high-volume production and in USB3 standard, which has nine electrical contacts, the housing structure may include multiple pieces for electrical contacts to fit in. As shown, separate plastic housings may be implemented to capture electrical contacts. However, it will be understood that more or fewer than two housings can be used. As illustrated, USB3 plastic housing 502 is to capture USB3 contacts, and USB2 plastic housing 508 is to capture USB2 contacts. In one embodiment, USB3 plastic housing 502 includes keys on both sides to snap into the notches in USB2 plastic housing 508. It will be understood that USB3 plastic housing 502 and USB2 plastic housing 508 may be parts of a single component. Together the two plastic housings make up a plastic housing for mounting electrical and optical interfaces. Floatable lens 510 (which may be a plastic floatable lens) is also shown positioned at a mating end of the connector.

Referring to FIG. 5B, the electrical leads for the electrical assembly are shown protruding from the back face of the connector housing, as illustrated by USB3 contacts 520 and USB2 contacts 522. USB2 plastic housing 524 provides a structure into which the floatable lens 534 is incorporated. Floatable lens 534 is floating because it is not rigidly mounted within the housing. Rather, the floating lens mechanism is implemented by having spring 528 butted against USB2 plastic housing 524 at one end and the plastic floatable lens at the other end. Spring 528 creates a tension or resistive force that pushes floatable lens 534 into the cavity formed by USB2 plastic housing 524 at the mating end. Spring 528 can be implemented as a coil or flat in form and can be made in plastic or in sheet metal. The cavity of USB2 plastic housing 524 has enough empty space for the floatable lens to move, rotate, or tilt within the space created. The mating end of the plastic housing includes a center stopper (e.g., a tab or face or other mechanism) against which floatable lens 534 may be pressed by spring 528.

Floatable lens 534 carries all precision features such as lens surfaces 532 for beam expansion, alignment notches 530 for engagement with the lens at the receptacle side, and fiber blind holes for fiber attachment. Fiber 526 is illustrated in a fiber channel formed within the connector housing, and mating with floatable lens 534 in a fiber blind hole. As illustrated, there are four separate lenses and optical fibers, which can be used to implement two separate optical channels within the connector.

When the plug is not engaged, floatable lens 534 is pushed against to the center stopper of USB2 plastic housing 524. When the plug is engaged, floatable lens 534 keys to the lens at the receptacle through alignment notches 530; thus, lens surfaces 532 at floatable lens 534 line up to those of the lens at the receptacle side. At the same time floatable lens 534 is pushed backward by the alignment bumps at the receptacle side. When floatable lens 534 is pushed back, the motion, whether translation or rotation, of USB2 plastic housing 524 is isolated from that of floatable lens 534.

In one embodiment, a combined optical and electrical interface connector may be an active interface including an optical IC in a light engine to process optical signals. In one embodiment, the optical signals may be transmitted from the connector or plug to a processing component for processing. In such an implementation, a transceiver module jumper cable assembly can convey the optical signal optically at least a part of the way to the processing component. Traditionally, the optical signal was exchanged with the connector over PCB traces, which reduces signal quality. By conveying the signal optically, higher signal quality and higher bandwidth can be achieved.

Figure 6:
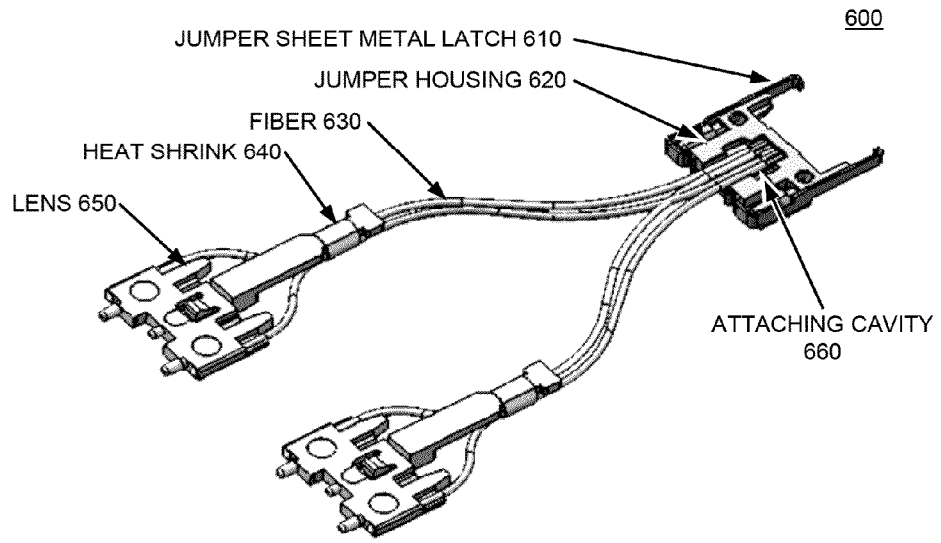
FIG. 6 is a block diagram of an embodiment of a jumper cable to convey optical signals between two components on a PC board.

FIG. 6 is a block diagram of an embodiment of a jumper cable to convey optical signals between two components on a PC board. Jumper assembly 600 allows the conveyance of light generated from an optical transceiver to peripherals through the combined optical and electrical connector discussed herein. In one embodiment, jumper assembly 600 includes plastic jumper housing 620, jumper sheet metal latch 610, fibers 630, heat shrink 640, and plastic lens 650. Jumper housing 620 may include precision through holes for fiber attachment, V-grooves at the pocket for macro fiber alignment to the precision through holes, and attaching cavity 660. In one embodiment, attaching cavity 660 may be a pocket for glue to secure fibers in jumper housing 620.

Figure 7:
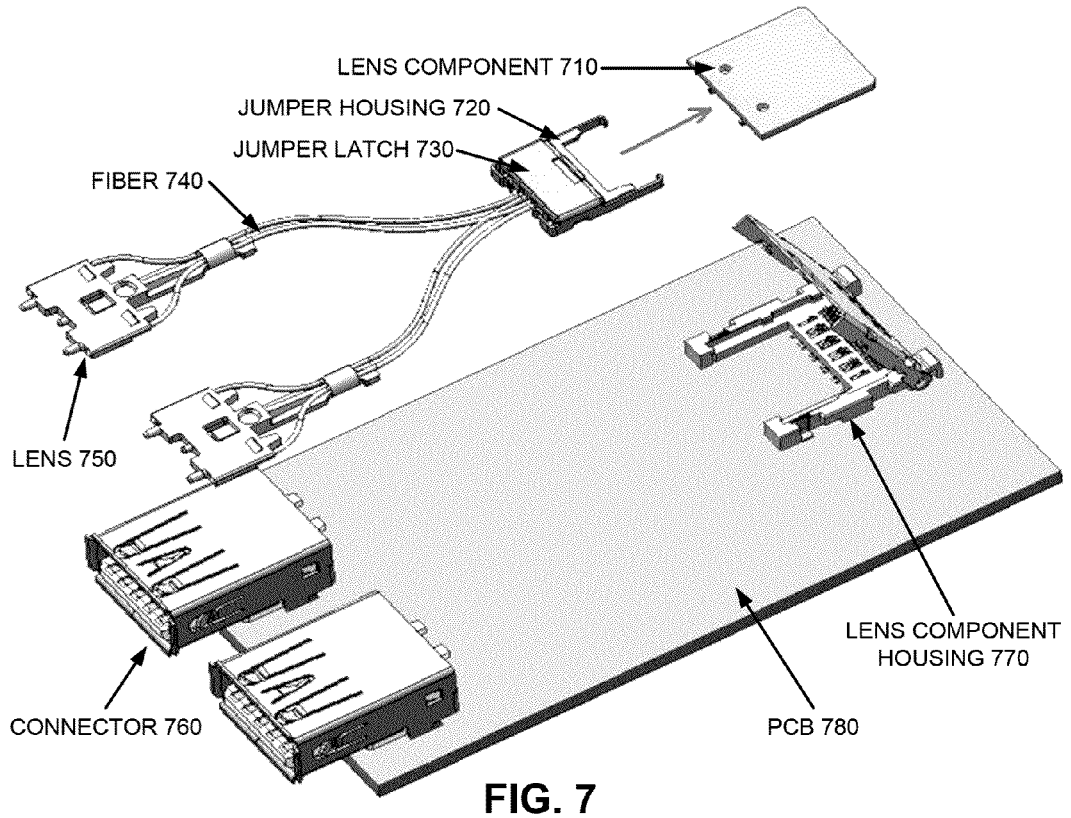
FIG. 7 is a block diagram of an embodiment of a jumper cable to exchange optical signals between a connector and a lens component.

The primary purpose of jumper housing 620 is to capture the fibers. Jumper sheet metal latch 610 is to secure engagement between jumper housing 620 and the optical transceiver. Fibers 630 act as a waveguide to convey light. In one embodiment, there is a pair of fibers per optical channel. As illustrated, four fibers are used, corresponding to two optical channels. A single channel jumper may be constructed similar to what is shown. Lens 650 includes precision features such as lens surfaces for beam expansion, alignment bumps or tabs for optical alignment between lens surfaces at the receptacle and plug, and blind holes for fiber attachment. Alignment could alternatively be provided by notches on lens 650, which correspond to bumps or tabs on the receptacle and plug. Lens 650 includes fiber guide channels to position the fibers to the blind holes, which allow the fibers to interface the actual lenses of lens 650. In addition, lens 650 may include two keys to lock itself to the connector receptacle. In one embodiment, heat shrink 640 can be used to secure fibers 630 at lens 650, as well as provide strain relief FIG. 7 is a block diagram of an embodiment of a jumper cable to exchange optical signals between a connector and a lens component. Jumper assembly 600 is illustrated in FIG. 6 by itself. Such a jumper assembly is shown in a context of a connection in FIG. 7. In one embodiment, the jumper assembly may be thought of as a patch cord which has one end terminated in a plastic ferrule, and one end terminated in an optical lens.

The jumper assembly includes jumper housing 720 to capture and align fibers 740 to lens component 710. Jumper latch 730 attaches jumper housing 720 to lens component 710. Jumper housing 720 may also be referred to as an optical connector component that interfaces an optical communication path. Lens component 710 may also include an optical termination component. Lens 750 is an optical lens component that allows optical interfacing at connector 760. In one embodiment, lens component 710 includes an optical signal processing component and an I/O routing processor, which may be separate processing components. The I/O routing processor may be responsible for electrical I/O from the electrical interface of the combination optical and electrical interfaces of connector 760. Additionally, as illustrated, multiple combined connectors may be serviced by a single processing unit.

Lens component 710 is disposed within lens component housing 770, which is installed on PCB 780. Connector 760 is also installed on PCB 780. The PCB layout includes some distance between connector 760 and lens component housing 770. Consequently, once the complete system is constructed, there is a certain distance between connector 760 and lens component 710. Conveying optical signals optically between connector 760 and lens component 710 results in improved signal quality.

As will be understood by those skilled in the art, one advantage of the jumper assembly as illustrated in FIGS. 6 and 7 is that the optical lens and fiber components are installable after solder processing. Electrical components are typically installed or attached to a PCB via solder, often through a reflow process. While different processing technologies are known, one common method is for a pick-and-place machine or equivalent to adhere (e.g., through a paste or glue, such as a solder paste) components in place, and place a solder paste at the electrical connections. The entire PCB with all installed components may then be exposed to heat or infrared (IR) to melt the solder paste (which typically includes solder flux), which solders the component leads to the trace contacts on the PCB or creates solder joints. The process may involve heat that is damaging to plastic components. Thus, optical fibers or other plastic components should be installed post-solder-processing to avoid damage. Typically, such components may have been installed individually, increasing the time and cost of production. The use of the jumper assembly can significantly reduce the board production time, while protecting plastic components from exposure to the solder processing.

Another advantage to the jumper assembly as illustrated is the passive alignment of optical components. Rather than requiring shining a light through an optical fiber and ensuring (e.g., manually) the alignment of each component prior to setting the components (e.g., via glue), the engaging of the lens assembly passively aligns the components. The passive alignment is furthered by a latch as discussed in more detail below.

With such a jumper assembly, optical signals can be conveyed from one part of a PCB to another optically. The conveying may be the transmitting of a generated signal (FIG. 8A), or the reception of a signal for processing from an external component (FIG. 8B). In either case, the signal is conveyed optically at least a portion of the distance between the optical lens component that interfaces at the connector, and the processing component that generates transmit signals and processes receive signals.

Figure 8A:
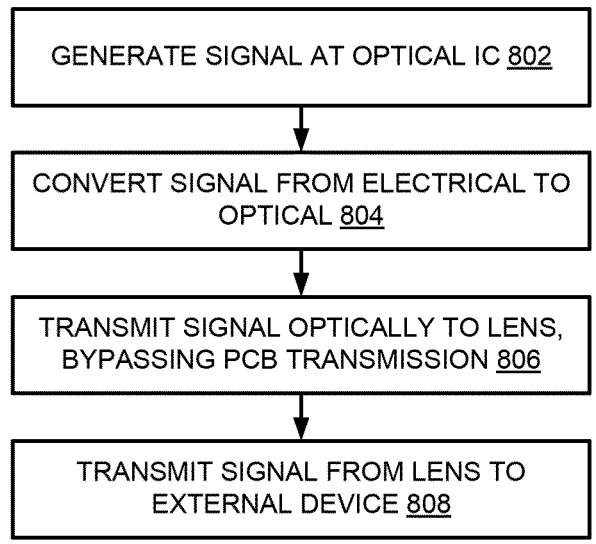
FIG. 8A is a flow diagram of an embodiment of sending an optical signal via a jumper cable.
Figure 8B:
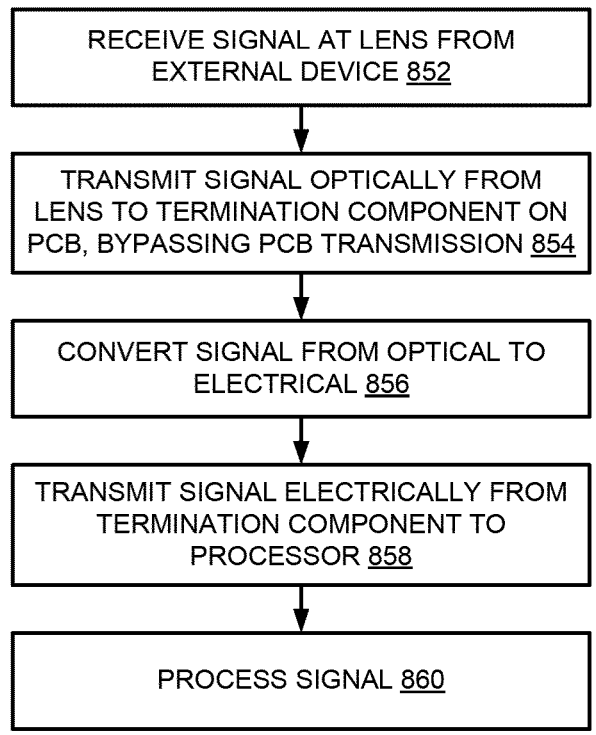
FIG. 8B is a flow diagram of an embodiment of receiving an optical signal via a jumper cable.

FIG. 8A is a flow diagram of an embodiment of sending an optical signal via a jumper cable. An optical IC of a PCB generates a signal to be transmitted optically to an external device attached to a connector of the PCB, 802. The signal is converted from electrical to optical, 804. The IC is assumed to operate electrically, and thus generates an electrical signal. The conversion of the signal to optical is performed in accordance with a standard for the optical signal that will be transmitted. The electrical signal may be passed from the optical IC to a component that generates an optical signal from the electrical signal. The component may be installed in close physical proximity on the PCB to the optical IC, reducing signal distortion. The converted optical signal is transmitted optically to a lens, 806. Conveying the signal optically bypasses transmission of the signal over PCB traces for at least the optical portion of the transmission to the lens. By placing the electrical-to-optical converter close to the optical IC, the signal can be transmitted mostly optically. The optical signal can then be transmitted from the lens to the connected external device, 808.

FIG. 8B is a flow diagram of an embodiment of receiving an optical signal via a jumper cable. For received signals, an optical signal is received at the lens (or optical lens component) from an external device, 852. The lens transmits the signal optically from the lens to a termination component installed on the same PCB, 854. Transmitting the signal optically for at least a portion of the distance between the lens and the termination component can bypass at least a portion of transmission that would otherwise be performed electrically over the PCB traces. It will be understood that the termination component may or may not be included within the processing component. In one embodiment, but for the fact that the signal needs to be converted from optical to electrical prior to being received at the processor, the signal may be conveyed optically essentially the entire distance from the lens to the processor.

The signal is converted from optical to electrical for processing, 856. The signal may then be transmitted electrically from the termination component to a processor, 858, which then can process the signal, 860.

Reference to components installed on the same PCB may refer to components installed on the same PCB backplane, or on PCB backplanes that are part of the same electrical circuit. The use of jumper boards electrically and mechanically coupled with connectors may be part of the same PCB for purpose of conveying optical signals from one component of a PCB to another component installed on the PCB. From the perspective of a combined optical and electrical connector, the electrical connections may be conveyed via a connector to a jumper board that contains a processing component. The optical signal may be conveyed optically to the processing component.

In addition to what is discussed above, the jumper assembly can reduce the fiber processing time by providing an improved optical interface. With the beam expansion and the self-alignment of the jumper assembly, lengthy polishing processing on fibers after cleaving can be avoided. The installation of the optical components is quick and simple—the lens simply plugs into the connector receptacle housing. As discussed above, exposure of the optical components to IR reflow processing can be avoided.

As discussed above with respect to the jumper assembly, the jumper assembly may include a connector latch that secures the optical connector to the lens component of the PCB. The latch mechanically secures the optical connector and aligns the optical components.

Figure 9A:
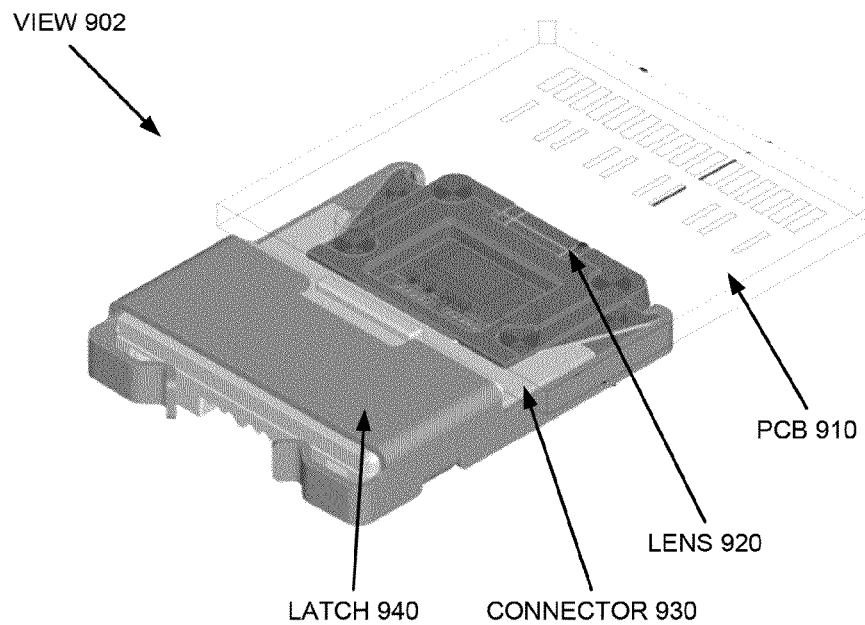
FIGS. 9A-9B are block diagrams of an embodiment of latch to interface and align an optical connector to a lens component.
Figure 9B:
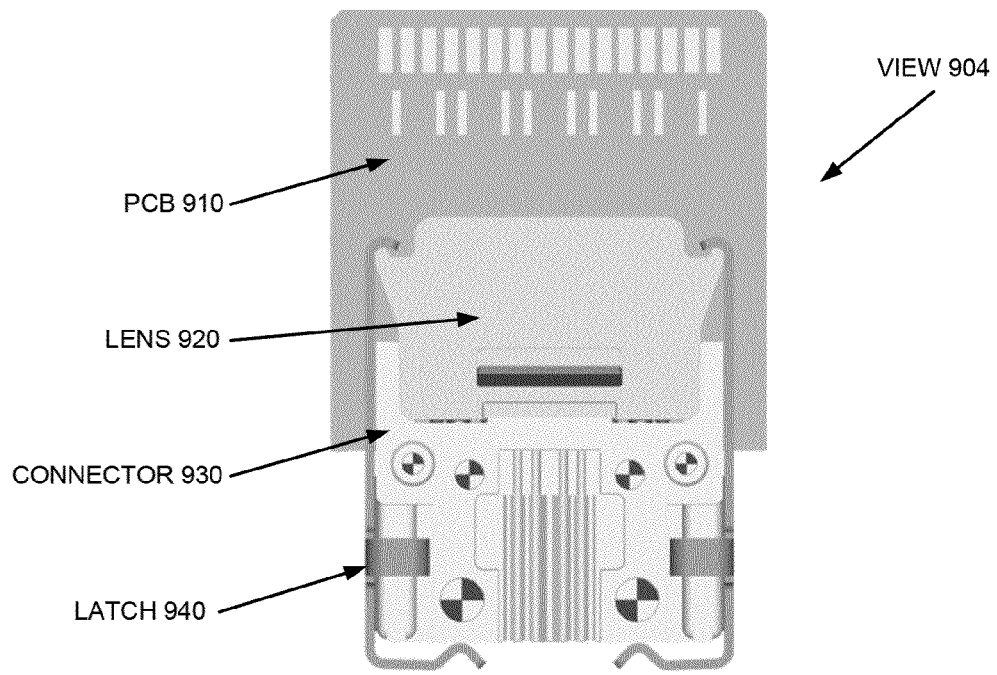

FIGS. 9A-9B are block diagrams of an embodiment of latch to interface and align an optical connector to a lens component. View 902 of FIG. 9A illustrates an optical connector component engaged with a latch to be connected to a lens component. More particularly, lens 920 illustrates a lens component installed on PCB 910. As illustrated in view 902, PCB 910 would be "in front" of connector 930 and lens 920, obstructing them from view from the perspective of view of FIG. 9A. In FIG. 9B, PCB 910 is in a background of the point of view of view 904.

Lens 920 is to interface with optical fibers of connector 930, which represents the optical connector component. Latch 940 secures the connector assembly including connector 930 and latch 940 to lens 920. The fastening mechanisms are illustrated in more detail below.

Thus, an optical connector component that includes at least one fiber guide channel for a fiber, can be installed onto a lens component mounted on a PCB. Thus, the fiber of the optical connector can be properly aligned and interfaced with a lens of the lens component. Latch 940 mechanically secures the optical connector component to the lens component. Latch 940 includes a spring mechanism, one example of which is described in more detail below. The spring mechanism exerts a spring force to continually engage the optical connector component with the lens component. A pre-loaded spring latch enables simple installation that provides a secure connection between the connector and the lens at all times. The spring force of the latch restrains the connector from moving, which permits a better connection between the lens and the fibers.

Figure 10A:
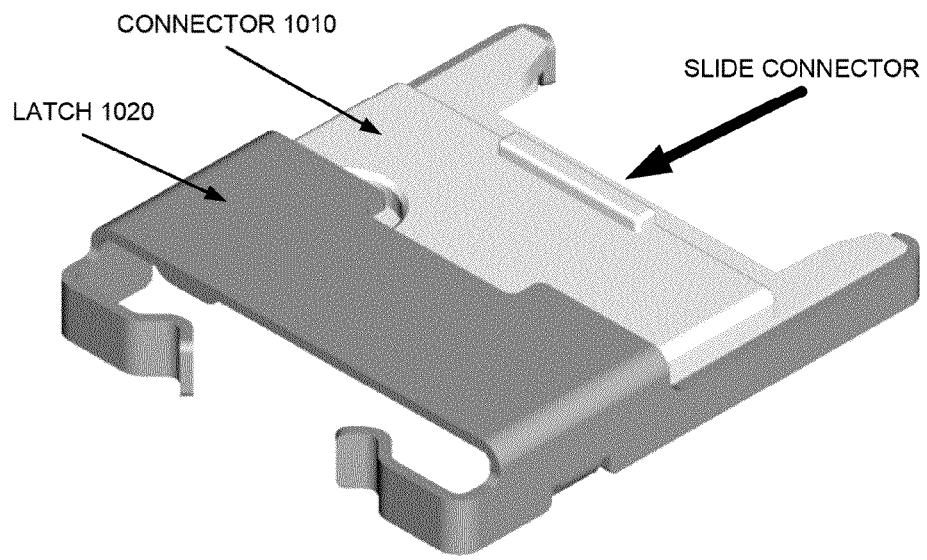
FIGS. 10A-10B are block diagrams of an embodiment of an optical connector mounted in a latch.
Figure 10B:
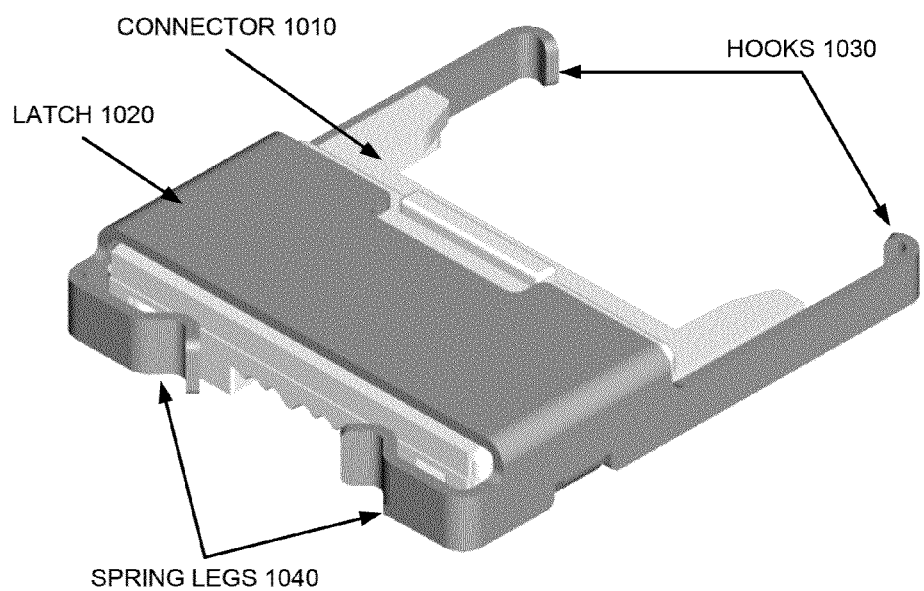

FIGS. 10A-10B are block diagrams of an embodiment of an optical connector mounted in a latch. As illustrated in FIG. 10A, connector 1010, an optical connector component, can be installed into latch 1020 by sliding the connector into the latch. As illustrated in FIG. 10B, in one embodiment, connector 1010 is engaged against spring legs 1040 of latch 1020, which provides a resistive force, pushing the connector toward hooks 1030 when the assembly is installed. Hooks 1030 are part of a hook and hook anchor mechanism that secures the connector. Hooks 1030 attach to an anchor or retainer on the lens component or PCB.

Figure 11A:
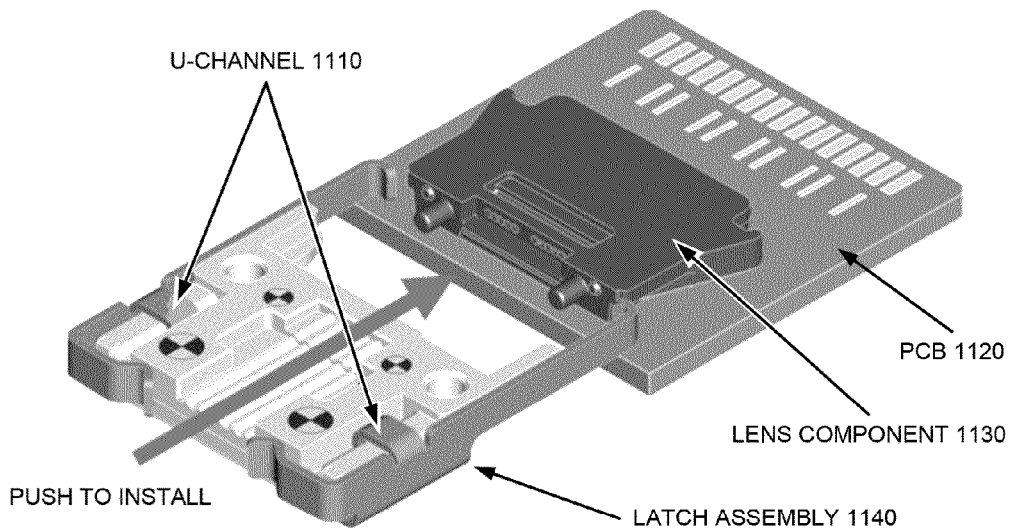
FIGS. 11A-11B are block diagrams of an embodiment of a latch that secures an optical connector to a lens component with a spring force.
Figure 11B:
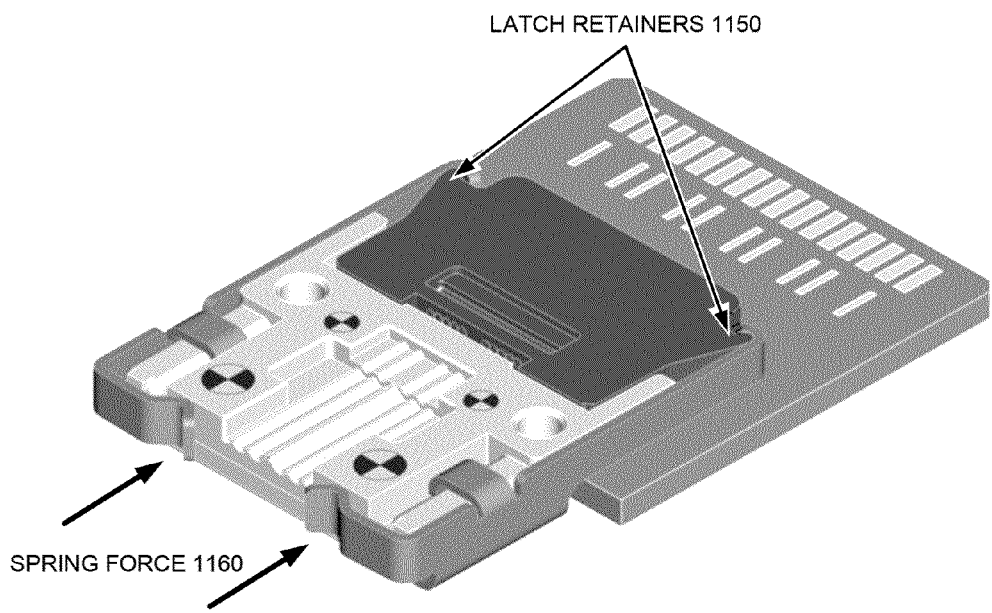

FIGS. 11A-11B are block diagrams of an embodiment of a latch that secures an optical connector to a lens component with a spring force. The latch and connector are engaged as latch assembly 1140. Latch assembly 1140 is to engage with lens component 1130 of PCB 1120. As illustrated, in one embodiment, the latch includes u-channels 1110 that secure the connector to the latch. The u-channel can be created by a tab of the latch bent or formed into a "U" shape to interface with a groove or ridge of the connector. It will be understood that a "V" shape could alternatively be used equally. The u-channel retains the latch and connector together as an assembly, and limits vertical movement of the connector within the latch. Installation between latch assembly 1140 and lens component 1130 may be simple as a "push to install" that will engage the hooks of the latch, as illustrated in FIG. 11B.

Referring to FIG. 11B, when latch assembly 1140 is fully engaged with lens component 1130, the spring leg features of the latch provide spring force 1160 to the connector, forcing the connector to securely mate to lens component 1130. The force created from the interference from the hook features and the spring leg features, mechanically pushes the connector towards the lens component at all times. In one embodiment, spring force 1160 is maintained when the assemblies are fully engaged by latch retainers 1150, which secures the latch to the lens component.

The latch of latch assembly 1140 is constructed from a material such as metal that has shape resilience. Shape resilience refers to the feature of a particular material of composition that the material resists a change to the shape. Thus, the material is sufficiently non-malleable to maintain its shape even when force is applied that attempts to distort the shape of the material. The force applied that would attempt to distort the shape of the material may be, for example, mechanical interference with the shape by another object.

As illustrated in FIGS. 11A and 11B, in one embodiment, latch retainers 1150 cause the hooks of the latch to bow out while being engaged. However, the shape resilience of the hooks causes the hooks to push back and engage with the retainers. A similar effect could be achieved by forcing the hooks inward instead of outward in an alternate embodiment. The spring legs of the latch assembly are likewise distorted outward, away from the connector during installation. When the hooks are engaged, the shape of the spring legs is slightly distorted by mechanical interference of the connector pushing against the spring legs. The spring legs in turn resist the mechanical interference, and push back against the connector, thus creating a constant tension pushing the connector toward the lens component. Other shapes of spring legs could be used, as well as alternate shapes of the hooks. Alternatively, spring force 1160 could be applied by one or more coil springs installed between an edge of the latch and the connector, which pushes the connector toward the lens component.

Figure 12:
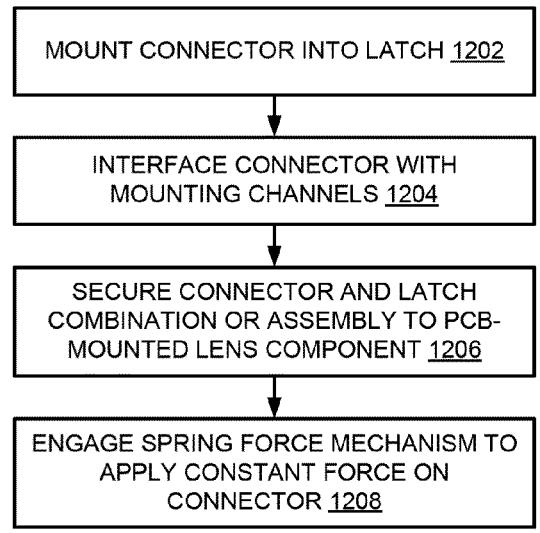
FIG. 12 is a flow diagram of an embodiment of securing an optical connector to a lens component with a latch.

FIG. 12 is a flow diagram of an embodiment of securing an optical connector to a lens component with a latch. An optical connector component is mounted into a latch to form a latch assembly, 1202. Mounting the connector component could include interfacing the connector component with mounting channels of the latch, 1204. For example, the latch may include "U-shaped" or "V-shaped" channels that engage with a corresponding mechanical structure on the connector.

The connector and latch assembly or combination are mechanically secured to a lens component mounted or installed on a PCB, 1206. The latch assembly secured to the lens component engages a spring force mechanism that applies constant force on the connector component, pushing the connector component toward the lens component, 1208. With the constant force, the optical components of the connector (e.g., optical fibers and/or lenses) are properly aligned and interfaced with corresponding optical components of the lens component (e.g., lenses).

In one embodiment, the optical interface connector housing can be an optical USB Standard-A flipped receptacle. In another embodiment, the optical interface connector housing can be an optical USB Standard-A non-flipped receptacle. Discussion above with reference to the jumper assembly focused mainly on examples of a flipped receptacle housing. To use a non-flipped receptacle housing, the leads of the electrical contacts for the USB electrical interface would at least partially compete with the physical space through which the lens would be inserted and incorporated into the receptacle housing. An extended lens assembly can be used to properly interface the optical components, as illustrated in FIGS. 13 and 14.

Figure 13:
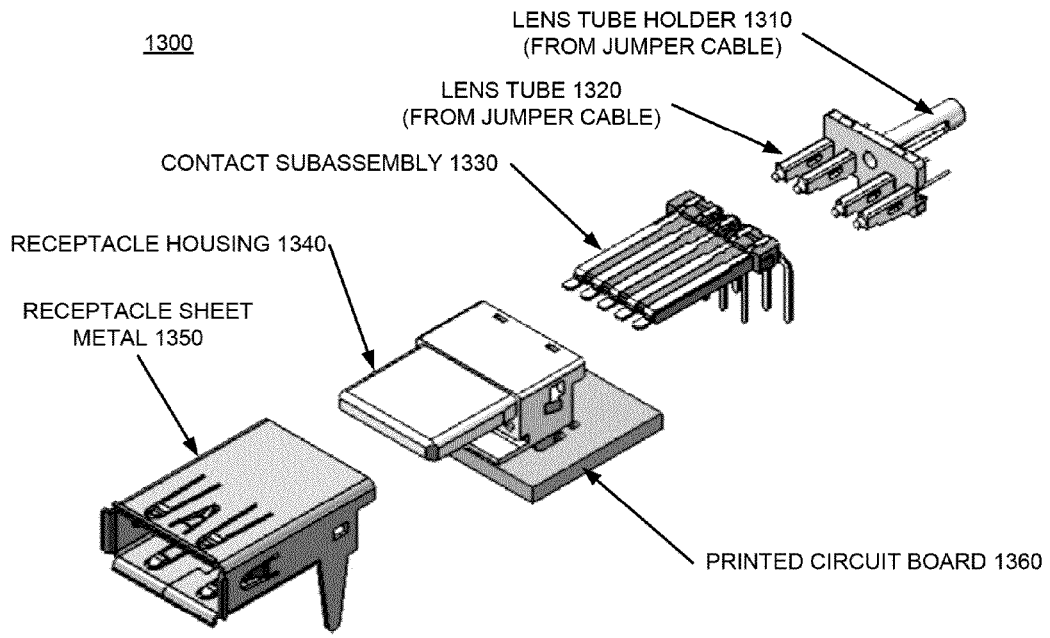
FIG. 13 is a block diagram of an embodiment of a non-flipped combined optical and electrical interface.
Figure 14:
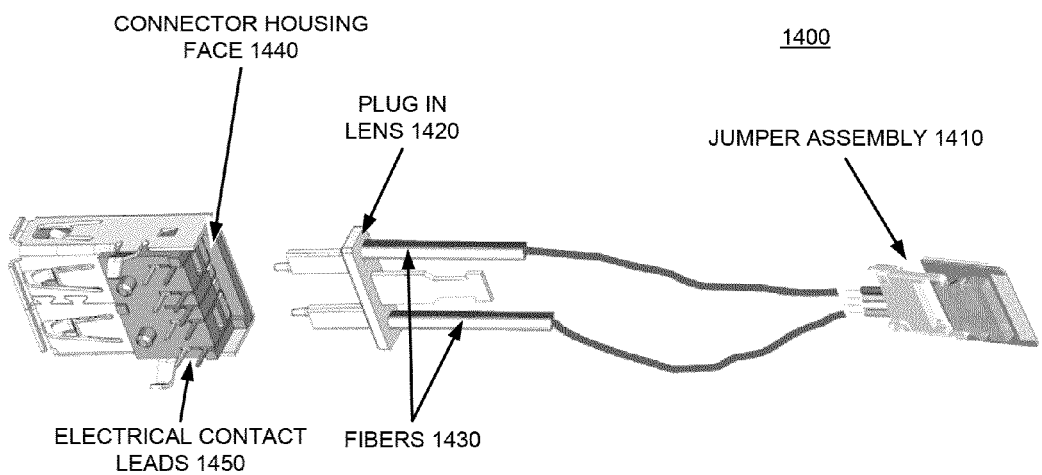
FIG. 14 is a block diagram of an embodiment of a non-flipped combined optical and electrical interface with a lens tube holder interfacing a jumper assembly.

FIG. 13 is a block diagram of an embodiment of a non-flipped combined optical and electrical interface. As is understood by those skilled in the art, a receptacle is 'flipped' when the tongue of the receptacle housing is at the lower half closer to the PCB and the cable plug has to flip to engage with the receptacle. A receptacle is referred to as 'non-flipped' when the tongue of the receptacle housing is at the upper half away from or facing the PCB. Thus, the electrical contacts are on the tongue of the receptacle housing, at the top of the receptacle, facing the PCB. The flipped configuration is common when the connector supports USB3, seeing that USB3 requires an additional five electrical contacts with associated leads to connect signals the PCB associated with the connector.

Assembly 1300 includes receptacle sheet metal 1350, which interfaces mechanically with the PCB associated with the connector (typically it "sits on" or abuts the PCB). Receptacle sheet metal 1350 captures receptacle housing 1340, and provides mechanical coupling and EMI shielding for connection to a mating plug. Receptacle housing 1340 locks into receptacle sheet metal 1350, and receives the optical and electrical interface assemblies.

Contact subassembly or assembly 1330 includes a housing (typically plastic) that captures both USB3 and USB2 contacts. Contact subassembly 1330 locks into receptacle housing 1340. As seen from assembly 1300, contact subassembly 1330 has leads that protrude toward PCB 1360, and at least partially obstruct the face of receptacle housing 1340 through which contact assembly and the optical subassembly are to be inserted. In a flipped configuration, the leads would not need to obstruct the opening, given the electrical contact subassembly would be installed on the lower half of the receptacle housing, closer to the PCB.

In one embodiment, assembly 1300 includes lens tube holder 1310, which in turn includes multiple lens tubes 1320. Lens tubes 1320 are sufficient in length to extend through the leads of contact subassembly 1330, and engage with or interface with a lens or other optical component in receptacle housing 1340. Thus, the obstruction by contact subassembly 1330 does not interfere with optical interfacing and I/O. The lens components discussed above include precision features that help align the optical interfacing. Similarly, lens tube 1320 includes precision features such as lens surfaces for beam expansion and blind holes for fiber attachment, as well as alignment mechanisms (e.g., notches, bumps, tabs). Lens tube holder 1310 captures and pushes each plastic lens tube 1320 into receptacle housing 1340. In one embodiment, lens tube holder 1310 can combine with the lens tubes to become one plastic part. As a single part, all lenses can be jointly aligned properly in receptacle housing 1340. In one embodiment, lens tube holder 1310 and lens tubes 1320 are part of a jumper cable assembly.

FIG. 14 is a block diagram of an embodiment of a non-flipped combined optical and electrical interface with a lens tube holder interfacing a jumper assembly. Assembly 1400 offers a slightly different view of a jumper assembly with lens tubes. The connector of assembly 1400 includes a connector housing with connector housing face 1440. As illustrated, electrical contact leads 1450 extend down from the contacts within the connector, and obstruct the opening of connector housing face 1440.

In one embodiment, the connector is to interface with jumper assembly 1410, such as that discussed above. Jumper assembly 1410 connects to plug-in lens 1420, which includes extended tube lenses. Fibers 1430 extend from fiber blind holes of plug-in lens 1420 to jumper assembly 1410. It will be observed that lens tube holder 1310 of FIG. 13 is also a plug-in lens, and contains four lens tubes 1320. Plug-in lens 1420 of FIG. 14 includes two lens tubes. Thus, in one embodiment, the lens of FIG. 13 accommodates two separate optical channels, while the lens of FIG. 14 accommodates one.

Figure 15:
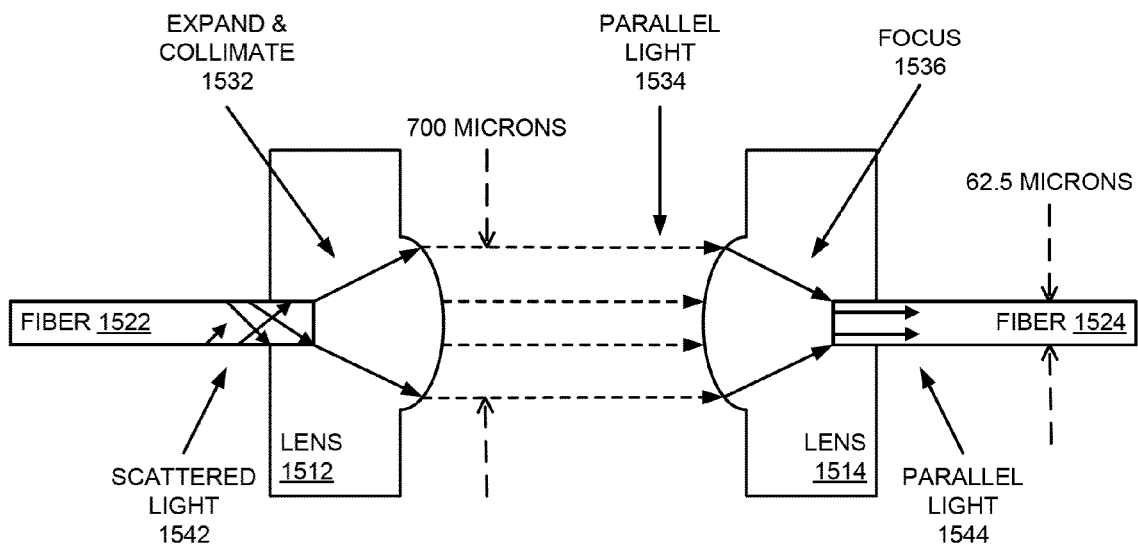
FIG. 15 is a block diagram of an embodiment of beam expansion.

FIG. 15 is a block diagram of an embodiment of beam expansion. As illustrated, an optical signal is passed through fiber 1522, and to be transferred to fiber 1524. The optical beam in fiber 1522 is expanded and collimated 1532 by lens 1512, and can then be interfaced as a wider beam to lens 1514. As shown in the example provided, fibers 1522 and 1524 may be approximately 62.5 microns in diameter, while the expanded beam is passed between lenses 1512 and 1514 with a diameter of approximately 700 microns. The expansion of the beam makes it possible to optically couple fibers 1512 and 1514, where traditional butt coupling would not provide adequate performance for the mechanical tolerances of most connector. Even a slight offset could cause a significant signal loss for a non-expanded beam—even just a few microns offset could lose more than 10% of the signal or more. However, with the beam expansion, mechanical tolerance is improved, as is tolerance to dust or other optical obstructions.

While the optical beam within fiber 1522 may consist of highly parallel photons, for purposes of illustration, fiber 1522 is shown to include scattered light 1542. Even for a situation where an optical beam has scattered light within a fiber, the expansion and collimating (1532) improves optical signal quality by directing the photons more parallel. Thus, parallel light 1534 is shown transferred between lenses 1512 and 1514. The optical beam is focused 1536 by lens 1514, and parallel light 1544 is transmitted through fiber 1524.

To the extent various operations or functions are described herein, they may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An input/output (I/O) apparatus comprising:
   an input/output connector wherein the input/output connector comprises both electrical and optical input/output interfaces and the optical input/output interface comprises at least one optical lens,
   at least one optical fiber wherein a first end of the at least one optical fiber terminates in the input/output connector and is optically coupled to the at least one optical lens, and
   a transceiver module to convert optical signals into electrical signals wherein the transceiver module comprises at least one lens, wherein a second end of the at least one optical fiber terminates in the transceiver module, and wherein the input/output connector and the transceiver module are not coterminous.

2. The apparatus of claim 1 wherein the electrical input/output interface is to provide electrical input/output according to a standard for universal serial bus (USB), high definition multimedia interface (HDMI), or DisplayPort.

3. The apparatus of claim 1 wherein the transceiver module is additionally to process optical signals in accordance with a protocol of the electrical input/output interface.

4. The apparatus of claim 1 wherein the transceiver module comprises a photodetector, a laser diode, and an integrated circuit chip to control the photodetector and the laser diode.

5. The apparatus of claim 1 wherein the input/output connector comprises a first optical lens that is part of a light path that light entering the input/output connector can travel and be detected by a photodetector that is part of the transceiver module and a second optical lens that is part of a light path that light exiting a laser diode that is part of the transceiver module can travel and be output though the input/output connector.

6. The apparatus of claim 1 wherein the input/output connector additionally comprises a receptacle housing and the electrical input interface comprises an electrical contact assembly incorporated in the receptacle housing.

7. The apparatus of claim 1 wherein an end the optical fiber that terminates in the transceiver module terminates in a connector that is connected through a latching mechanism to a lens component for optical signal processing that comprises at least one lens.

8. The apparatus of claim 1 wherein the at least one lens is not rigidly fixed within the input/output connector.

9. The apparatus of claim 1 wherein the at least one lens is to focus a collimated light beam into the at least one optical fiber.

10. The apparatus of claim 1 wherein the transceiver module is also to convert electrical signals into optical signals.

* * * * *